No. 732,900. PATENTED JULY 7, 1903.
M. SCHLÜSSEL.
MACHINE FOR STRAINING FOOD PRODUCTS OR THE LIKE.
APPLICATION FILED DEC. 20, 1901.
NO MODEL.

Witnesses
Jean Hofer
Else Mohrhaut.

Inventor
Max Schlüssel
By Theodor Heese
Attorney.

No. 732,900.

Patented July 7, 1903.

UNITED STATES PATENT OFFICE.

MAX SCHLÜSSEL, OF DUSSELDORF, GERMANY.

MACHINE FOR STRAINING FOOD PRODUCTS OR THE LIKE.

SPECIFICATION forming part of Letters Patent No. 732,900, dated July 7, 1903.

Application filed December 20, 1901. Serial No. 86,706. (No model.)

*To all whom it may concern:*

Be it known that I, MAX SCHLÜSSEL, a subject of the King of Prussia, German Emperor, residing at Dusseldorf-on-the-Rhine, in the Province of the Rhine, Kingdom of Prussia, German Empire, have invented new and useful Improvements in Machines for Straining Food Products and the Like, of which the following is a specification.

The subject of the present invention is a straining-machine to meet the requirements of large kitchens and factories for making preserves.

The said invention relates to that kind of straining-machine in which the food preparation to be strained is operated upon by the aid of rollers, which are rotatable about horizontal axes and turn around a common vertical axis. A disadvantage in machines of this kind has hitherto been the fact that in the case of large machines the rollers at times cease to rotate about their longitudinal axes, owing to their becoming jammed, upon which they slide on without rolling around. Consequently the food preparation under such roller at the time sticks and the roller has no effect. Moreover, the pressure (always in a vertical direction) exerted by the rollers on the underlying diaphragm while rotating is not always sufficient to be effective with food products of a resisting nature.

According to the present invention the rollers are forcibly rotated about their approximately horizontal axes, as well as around their common vertical axis.

Figure 1:
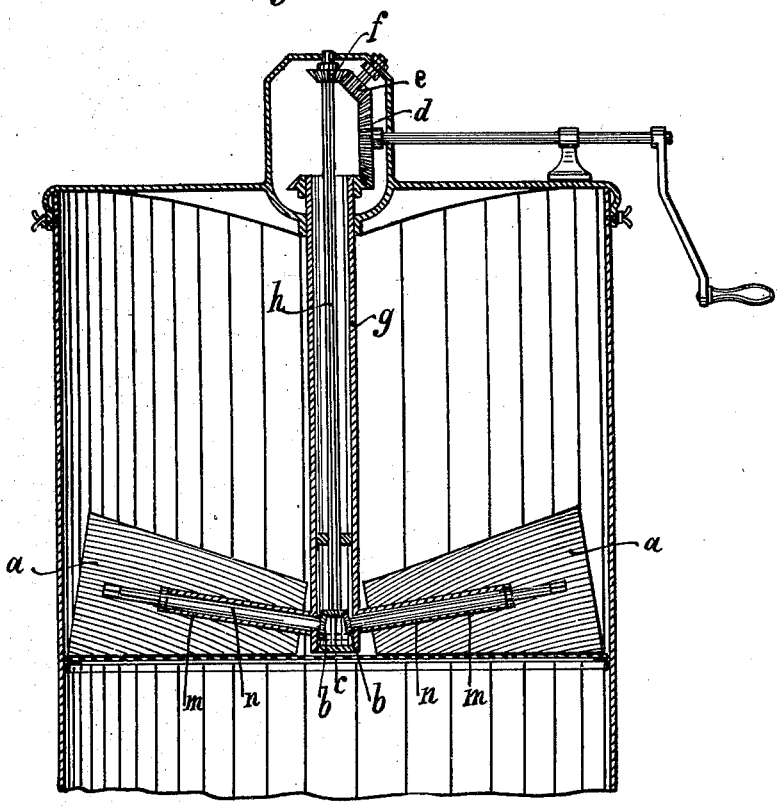
Figure 2:
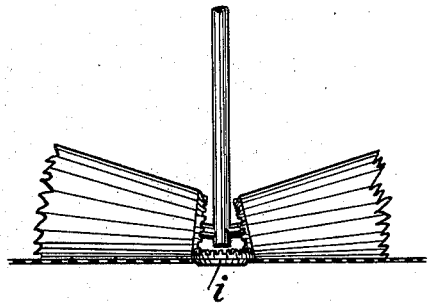

In the accompanying drawings, Figure 1 illustrates in longitudinal section one form of such an apparatus. Fig. 2 shows a part of the bottom of a modified machine, and Fig. 3 shows a part of the top of another modification.

With the aid of a cog-wheel $d$, fixed to a crank-shaft, the hollow vertical shaft $g$ is rotated. To the latter the conical rollers $a$ are rotatably attached by hollow branching shafts $m$, fitting into bores in the said rollers. The said rollers $a$ are thus not tightly fixed to the said hollow shafts $m$, but can rotate about same. Through the medium of a small cog-wheel $e$ another small cog-wheel $f$, which is fixed on the shaft $h$ passing through the hollow shaft $g$, is rotated. At the lower end of this shaft $h$ there is a small cog-wheel $c$, which rotates the cog-wheels $b\,b$, and with them the rollers $a\,a$, for the shafts $n\,n$ of the cog-wheels $b\,b$ reach through the hollow shafts $m\,m$ and engage with the substance of the rollers by means of flattened ends or squares. By this means when the crank is turned the rollers at the same time as they are turned around their common vertical axis are also forcibly rotated about their approximately horizontal axes, any sliding and the disadvantages accruing therefrom being thus under all circumstances prevented. The gearing, moreover, is so calculated that the rollers $a$ rotate faster than they would do if merely rolled over the surface of the foraminated diaphragm of the machine. Consequently not only will a vertical pressure bear upon the food preparation, but a pulling or dragging force will also come into play, which facilitates the tearing of fibrous constituents. The rollers $a$ might also be made to rotate the reverse way, so that they turn in the direction contrary to that of their common rotation around the vertical axis, for which it is only necessary to attach to the axis $h$ in place of the cog-wheel $c$ above the cog-wheels $b\,b$ a corresponding cog-wheel below the said wheels $b\,b$, as indicated by dotted lines in Fig. 1.

The form of construction according to Fig. 1 has the advantage that the entire mechanism is closed in, and thus does not come into contact with the soup or other food preparation to be strained, which is most satisfactory from the point of view of cleanliness and very favorable to the durability of the machine. If one be willing to dispense with this advantage, the considerably simpler form of construction according to Fig. 2 may be adapted, in which a small horizontal cog-wheel $i$ is fixed on the foraminated diaphragm so that it cannot rotate, while cog-wheels engaging with the said cog-wheels $i$ are fixed on the inner ends of the rollers. The said rollers rotate about solid shafts branching off from the solid vertical shaft.

Figure 3:
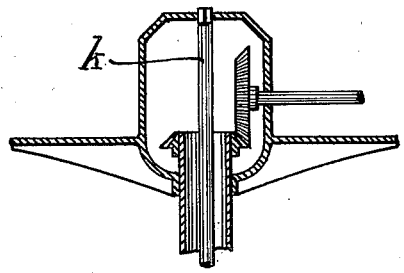

If the increased speed of the rollers $a$ is not desired, but the construction according to Fig. 1 is otherwise to be retained, we have the construction according to Fig. 3, in which the small cog-wheels $e$ and $f$ are omitted and the inner shaft $h$ is replaced by a shaft $k$, which is prevented from turning by its upper end being squared.

What I claim as my invention, and desire to secure by Letters Patent of the United States, is—

In a machine for straining food products the combination of a casing, a foraminated diaphragm containing such casing, an arm extending across the top of the casing, a vertical hollow shaft rotatably journaled in such arm and closed at the bottom, means for actuating such hollow shaft at the upper end thereof, hollow branching shafts extending approximately horizontally from the vertical shaft at the lower end thereof, cone-shaped rollers rotatably placed on such hollow branching shafts, so that the latter are fully covered by the said rollers, respectively, a solid vertical shaft passing through the hollow vertical shaft, means for actuating such solid vertical shaft at the upper end thereof, solid branching shafts passing through the hollow branching shafts and rigidly attached to the rollers at their outer ends, a gearing between the bottom of the solid vertical shaft and the inner ends of the solid branching shafts, respectively, as and for the purpose specified.

In testimony whereof I have signed my name to this specification in the presence of two subscribing witnesses.

MAX SCHLÜSSEL.

Witnesses:
CHARLES LESIMPLE,
CARL SCHMITT.